United States Patent
Hao et al.

(10) Patent No.: US 9,735,634 B2
(45) Date of Patent: Aug. 15, 2017

(54) SPLIT POLE SPOKE TYPE PM MACHINE WITH ENCLOSED MAGNETS

(71) Applicant: GM GLOBAL TECHNOLOGY OPERATIONS LLC, Detroit, MI (US)

(72) Inventors: Lei Hao, Troy, MI (US); Thomas W. Nehl, Shelby Township, MI (US); Chandra S. Namuduri, Troy, MI (US); Michael G. Reynolds, Troy, MI (US); Alexandru Rajala, Farmington Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 612 days.

(21) Appl. No.: 14/337,864

(22) Filed: Jul. 22, 2014

(65) Prior Publication Data

US 2016/0028281 A1   Jan. 28, 2016

(51) Int. Cl.
*H02K 1/27* (2006.01)

(52) U.S. Cl.
CPC ........... *H02K 1/2766* (2013.01); *H02K 1/276* (2013.01)

(58) Field of Classification Search
CPC .............................. H02K 1/2766; H02K 1/276
USPC .......................... 310/156.53, 156.56, 156.57
See application file for complete search history.

(56) References Cited

U.S. PATENT DOCUMENTS

| | | | |
|---|---|---|---|
| 6,847,143 B1 * | 1/2005 | Akemakou | H02K 21/042 310/154.38 |
| 2009/0224624 A1 * | 9/2009 | Kumar | H02K 1/276 310/156.53 |

* cited by examiner

*Primary Examiner* — Terrance Kenerly
(74) *Attorney, Agent, or Firm* — Quinn IP Law

(57) ABSTRACT

A rotor for a permanent magnet synchronous machine that includes a rotor core structure. A first set of permanent magnets forms poles within the rotor core structure. Each pole includes a pair of permanent magnets from the first set of permanent magnets. A first set of apertures is formed in a first radial layer of the rotor core structure. Each pole includes a pair of apertures from the first set of apertures. The first set of permanent magnets is inserted within the first set of apertures. Each pair of permanent magnets within a pole cooperatively generates a magnetic field in a same direction within the pole. The magnetic field generated by a respective pair of magnets in a respective pole is opposite to a magnetic field generated by a pair of permanent magnets in an adjacent pole.

16 Claims, 4 Drawing Sheets

SPLIT POLE SPOKE TYPE PM MACHINE WITH ENCLOSED MAGNETS

BACKGROUND OF INVENTION

An embodiment relates generally to permanent magnet motors.

A permanent magnet synchronous motor is an AC motor in which the rotation rate of the shaft is synchronized with the frequency of the AC supply current. A rotating electric field is generated in the stator and the rotor follows the rotating electrical field of the stator. The rotor rotates in step with the field of the stator at a same rate. The rotor and the stator are said to be in synchronization.

The permanent magnets used in conventional rotors are configured to provide a specified alternating magnetic field distribution in the air gap. In an effort to reduce the amount of rare-earth magnets, some machines utilize a permanent magnet assist synchronous reluctance machine structure utilizing cheaper ferrite magnets. These machines are constructed using straight or curved permanent magnets embedded in the rotor core; with as many as 8 to 10 magnets per pole requiring up to 5 different sets of tooling. Moreover, the costs to manufacture these magnets are expensive, and assembly within the rotor may be difficult based on the shape and size of the magnets.

Another approach to reducing the amount of rare-earth magnets is to use a conventional spoke-type rotor construction. However, the rotor structure for a conventional spoke-type rotor is a multi-piece construction utilizing a plurality of individual components to assemble and couple the rotor structure together particularly using pins and rods to reduce mechanical stress encountered during elevated speed operations of the motor.

SUMMARY OF INVENTION

An advantage of the invention described is the spoke-type lamination rotor design which simultaneously achieves high performance with a simple and inexpensive rotor core structure for high speed operation. The rotor core structure utilizing a plurality of single laminations which reduces parts count and simplifies the mechanical structure and reduces cost for high speed operation comparing to conventional spoke-type motors where the rotor lamination is a multi-piece construction utilizing pins and end caps to hold the together the rotor structure. The simple magnet shape allows for fewer magnet pieces compared to those motors used in permanent magnet synchronous reluctance (PMA SynRel) machines which can use from two to eight or more magnets per pole and have unconventional shaped magnets. Moreover, at least one pair of split pair magnets may be used pole which allows magnets to be made more robust while still offering the desired magnetic properties as seen in the PMA SynRel machines. Moreover, utilizing a conventional shape and sized magnet reduces assembly cost waste particularly in regards to scrap costs from broken magnets during assembly due to complex and non-robust shapes of the magnets.

An embodiment contemplates a rotor for a permanent magnet synchronous machine including a rotor core structure. A first set of permanent magnets forms respective poles within the rotor core structure. Each pole includes a pair of permanent magnets from the first set of permanent magnets. A first set of apertures is formed in a first radial layer of the rotor core structure. The first set of permanent magnets is inserted with the first set of apertures. Each pole includes a pair of apertures from the first set of apertures. The respective apertures within a respective pole are spaced a first circumferential distance apart. A second set of apertures is formed in a second radial layer of the rotor core structure. Each pole includes a pair of apertures from the second set of apertures. The second set of apertures is formed radially inward from the first set of apertures. A third set of apertures is formed in a third radial layer of the rotor core structure. The third set of apertures is formed radially outward from the first set of apertures. A second set of permanent magnets is inserted within the third set of apertures. The second set of permanent magnets have a different magnetic field strength relative to the first set of permanent magnets. Each pole includes a pair of permanent magnets from the first set of permanent magnets and a pair of permanent magnets from the second set of permanent magnets cooperatively generating a magnetic field in a same direction. The permanent magnets in the first and second layers of a respective pole generates the magnetic field in a direction opposite to a magnetic field generated by the permanent magnets in the first and second layers of an adjacent pole.

DETAILED DESCRIPTION

Figure 1:
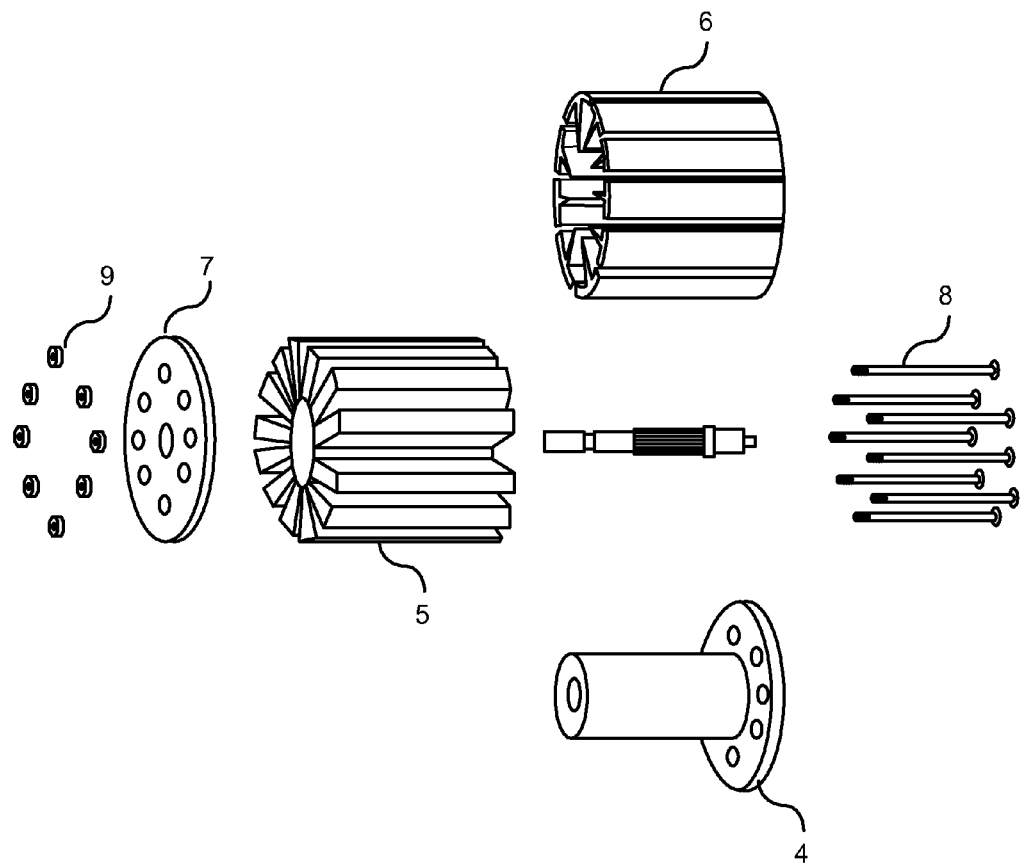
FIG. 1 is an exemplary expanded view of a conventional spoke-type prior art rotor assembly.

FIG. 1 illustrates an expanded view of a conventional rotor used in an electric motor synchronous machine as is known in the art. The conventional spoke-type rotor is a multi-piece rotor. The rotor includes a bobbin 4 with an integrated endcap on a first end of the bobbin 4. A plurality of individual magnets 5 is assembled into a like number of laminated steel pole assemblies 6 to form a rotor magnet/core assembly. The laminated steel pole assemblies 6 include disconnected individual steel pole pieces spaced between each set of adjacent magnets. The magnet/core assembly is inserted onto the bobbin 4. A second endcap 7 is coupled to the second end of the bobbin 4 and is secured together using a plurality of pins 8 that extend through the endcaps and the magnet/core assembly 6. The pins 8 are secured using fasteners 9. As a result, the conventional spoke-type motor is a multi-piece rotor structure requiring a plurality of parts for assembly.

Figure 2:
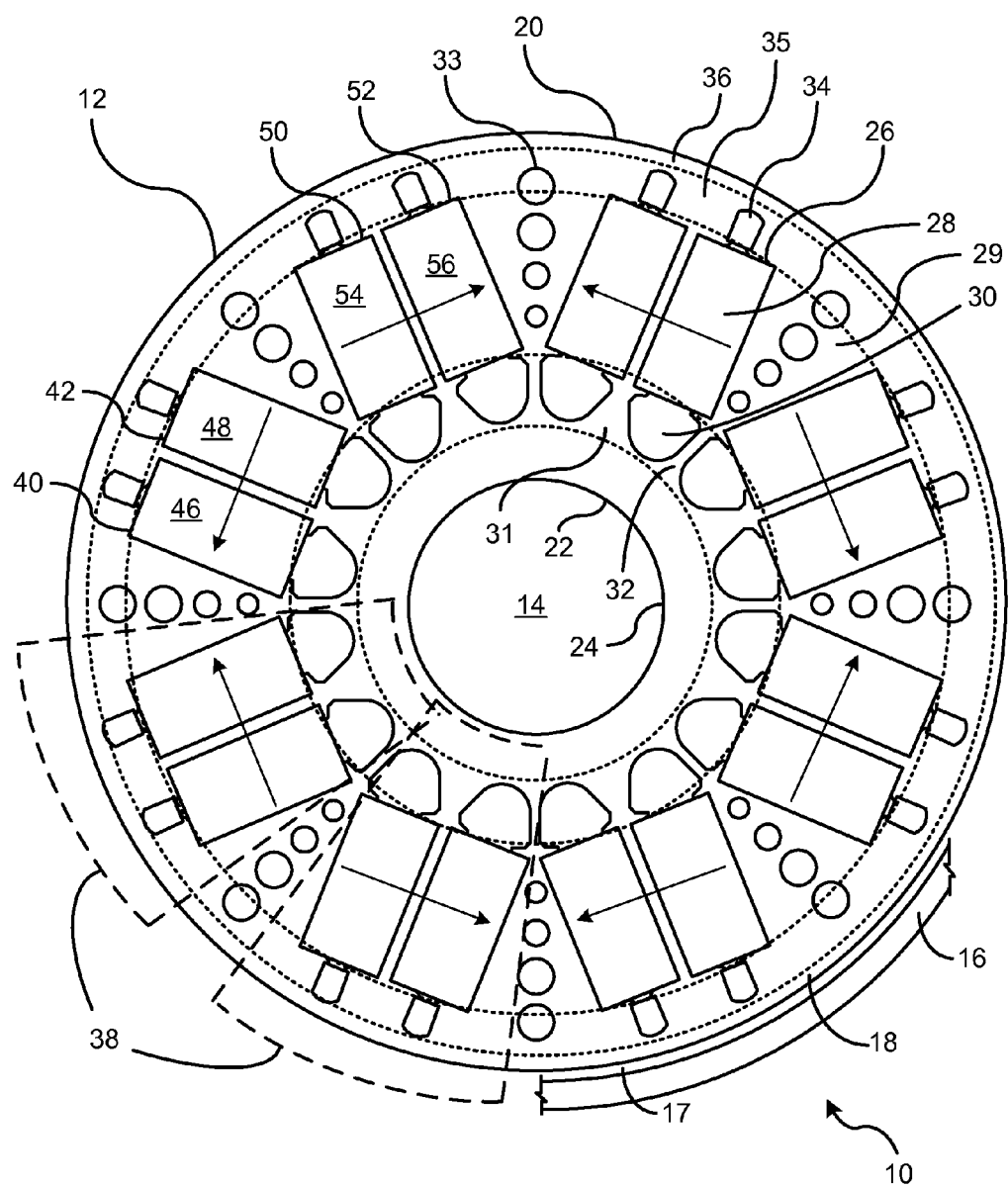
FIG. 2 is a section view of a rotor utilizing two-piece permanent magnets.

There is shown in FIG. 2 a sectional view of a permanent magnet motor 10. The permanent magnet motor 10 includes a rotor 12 coupled to a shaft 14. The rotor 12 can include any number of poles (e.g. 2, 4, 6, etc). A stator 16 is radially offset from the rotor 12 and is separated therefrom by an air gap 17.

The function of the rotor 12 is to drive a component coupled to the shaft 14. The stator 16 when excited by an excitation voltage (e.g., 3-phase supply) generates a rotating magnetic field within the motor 10. The rotor 12, which functions as a permanent magnet locks in with the rotating magnetic field generated by the stator 16. The rotor 12 rotates along with the rotating magnetic field generated by the stator 16. When the rotor 12 locks in with the rotating magnetic field, the motor 10 is in synchronization.

The rotor 12 includes a plurality of single piece spoke-type laminations 18 that are stacked and secured to the shaft 14. Typically, the plurality of spoke-type laminations 18 includes a circular shape of a respective diameter with an outer circumference wall 20 and an inner circumference wall 22. The inner circumference wall 22 forms a center aperture 24 in which the shaft 14 is inserted through the center aperture 24 and the plurality of spoke-type laminations 18 are press fit onto the shaft 14.

The rotor 12, as shown in FIG. 2, includes a first set of apertures 26 for receiving a set of permanent magnets 28. The first set of apertures 26 are preferably rectangular shaped; however, the size and shape of the first set of apertures 26 are dictated by the size and shape of the permanent magnets inserted therein. The shape and size of the first set of permanent magnets 28 is selected based on magnetic field required, and also the size and shape desired for manufacturing assembly and robustness of the motor.

The first set of apertures 26 extend within a middle radial layer 29. The first set of apertures 26 are circumferentially spaced within the middle radial layer 29 between the shaft 14 and the stator 16 (as shown in FIG. 1).

The rotor 12, as shown in FIG. 2, includes a second set of apertures 30. The second set of apertures 30 are an extension of the first set of apertures 26. The second set of apertures 30 are formed on a respective side of the first set of apertures 26 closest to the center aperture 24 in an inner radial layer 31. The second set of apertures 30 are void of any permanent magnets thereby creating air gaps with the rotor 12.

The second set of apertures 30 are shaped so that spokes 32 are formed between adjacent apertures 30 of juxtaposed poles. The spokes 32 connect the active rotor structure to the shaft. The spokes 32 also become saturated limiting the amount of magnet flux short circuited through the spokes of the rotor 12. This respective configuration forms the spoke-type lamination.

Figure 3:
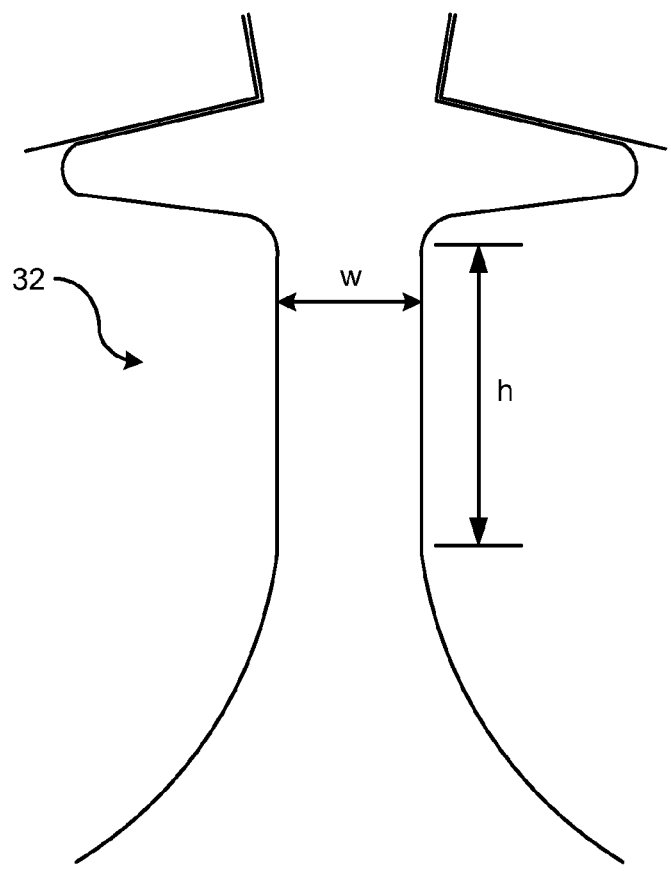
FIG. 3 is an enlarged section of a single spoke.

FIG. 3 illustrates an enlarged section of the spoke structure. Each spoke 32 must be at least a respective length to block flux passing there through and is preferably rounded at the ends and transition points to reduce mechanical stress. A base of each spoke is substantially rectangular shaped that is defined by a respective width (w) and length (l). Preferably, the width of the spoke is between 1-3 mm and the length is preferably between 2-6 mm. For saturation purposes, a thinner spoke allows for greater saturation, but a wider spoke provides enhanced mechanical strength. As a result, these two parameters should be optimized to find a balance between mechanical stress and electromagnetic performance. The spokes 32 allow magnetic flux to short circuit therethrough; however, the spokes once saturated function as air, limiting the amount of magnet flux short circuited through the spokes of the rotor. This respective configuration forms the spoke-type lamination.

Referring again to FIG. 2, the rotor 12, includes a third set of apertures 33 formed between the apertures of the first set 26. The third set of apertures 33 are formed preferably in low flux density regions of the rotor 12. The third set of apertures 33 reduces the rotor weight and the inertia of the rotor 12. As shown in FIG. 2, the third set of apertures 33 are circular shaped and extend in a radial direction; however, the third set of apertures 33 may include other shapes and configurations which assist with the weight reduction without impeding the flux flow for the permanent magnet motor.

The rotor 12, as shown in FIG. 2, further includes a fourth set of apertures 34. The fourth set of apertures 34 are an extension of the plurality of apertures 24. The fourth set of apertures 34 are formed on a respective side of the first set of apertures 24 closest to the outer circumference 20 in a third layer 35. The fourth set of apertures 34 are smaller in size in contrast to the first set of apertures 26. The fourth set of apertures 34 may include a respective permanent magnet or an air gap. A determination of whether to utilize a permanent magnet or an air gap in the fourth set of apertures 34 is based on the desired output torque and/or speed of the motor.

A top bridge 36 is formed between the outer circumference wall 20 of the rotor and each aperture in the third set of apertures 34 for bridging the lamination material so none of the apertures of the third set 34 are open to the air gap 17. As a result, each lamination 18 is formed as a single piece structure, as opposed to a plurality of segments integrated together. The single-piece lamination structure using the top bridge 36 and the spoke-type lamination design maintains mechanical stress, reduces bridge saturation flux density, and allows different types of magnets to be used which can minimize the magnet costs, and increase robustness of the magnets, particularly in assembly.

Permanent magnet motors typically include one permanent magnet per pole, however, as shown in FIG. 2, a split pole technique is utilized where two individual and non-contacting permanent magnets are disposed within each of the respective poles 38. Therefore, each of the respective poles 38 will include a first aperture 40 and a second aperture 42 spaced by a predetermined distance 44. The first aperture 40 and the second aperture 42 are circumferentially aligned with one another within a poll. A first permanent magnet 46 is seated in the first aperture 40 and a second permanent magnet 48 is seated in the second aperture 42. The polarity of the first permanent magnet 46 and the second permanent magnet 48 are oriented in a same direction such that both the first and second permanent magnets 46 and 48 within a respective pole generate a magnetic force in a same direction (as indicated by the arrows). Similarly, an adjacent pole will include a pair of respective apertures 50 and 52. A pair of permanent magnets 54 and 56 is inserted within apertures 50 and 52, respectively. The polarity of the permanent magnets 54 and 56 are oriented in a same direction to one another (as indicated by the arrows) such that both the first and second permanent magnet 46 and 48 generate a magnetic force in a same direction; however, the direction of the magnetic field cooperatively generated by the first and second permanent magnet 54 and 56 of the adjacent pole is opposite of the direction of the magnetic force generated by permanent magnets 44 and 46. As a result, each pole of the rotor will have at least two permanent magnets generating a force in a same direction, and in addition, the cooperative force from each of the permanent magnets in a pole will be in a direction that opposes a cooperative force from permanent magnets in an adjacent pole.

In FIG. 2, the split pole spoke machine as illustrated can utilize one-piece magnets or two-piece magnets. The term one-piece or two-piece magnet refers to the number of paired magnets in a radial layer of a pole. Each pole will include at least one pair of split magnets, and each pair of split magnets in a respective layer have a same size and shape, and are circumferentially spaced from one another in a same circumferential layer. A rotor having only pair of permanent magnets disposed in the first layer is defined as a split pole spoke machine with one-piece magnets.

A split pole spoke machine with two-piece magnets will include a first pair of split permanent magnets in the middle radial layer 29, and a second pair of split permanent magnets in the outer radial layer 35 disposed radially outward from the middle radial layer 29.

The determination of whether a split pole spoke machine with one-piece magnets or two-piece magnets is utilized is a function of the torque required by the motor. If the torque of the motor does not require two-piece magnets, then one-pair of split permanent magnets are used in the middle radial layer 29 while the apertures designated for the permanent magnets in the outer radial layer 35 are left void of permanent magnets. As a result, an air gap is present in those apertures of the outer radial layer 35 where the permanent magnets would be otherwise inserted. If the torque of the motor requires two-piece permanent magnets, then the fourth set of apertures 34 in the outer radial layer 35 would include permanent magnets. It should be understood that the permanent magnets in the middle radial layer 29 and the outer radial layer 35 need not be the same size or shape. Rather, the size and shape of the magnets may be selected based on the required torque and cost effectiveness of manufacturing the magnets as well as the ease of assembly of the permanent magnets in the rotor. Moreover, in a two-piece permanent magnet motor, the pairs of magnets in a pole are radially aligned to one another.

Figure 4:
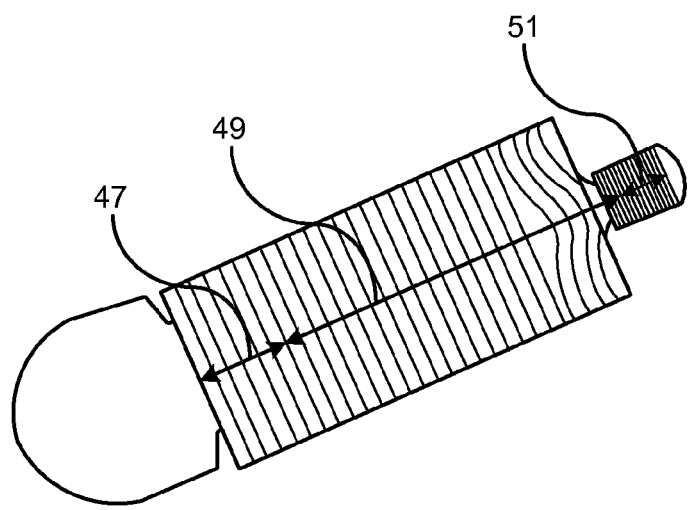
FIG. 4 is an enlarged view of a set of magnets in the motor illustrating the short circuit flux.

The top bridge will be utilized for shorting the flux. Permanent magnets in the middle layer (e.g., ferrite magnets) and permanent magnets in the outer layer (e.g., rare earth magnets) are inserted within their respective apertures. FIG. 4 illustrates the regions of useful and non-useful flux. Element 47 represents a region of non-useful flux in the ferrite permanent magnets, and element 49 represents a region of useful flux generated by the ferrite magnet and the rare earth magnet. Element 51 represents a region of non-useful flux in the rare earth magnet. As shown, approximately 25% of the flux generated by the ferrite magnet is shorted by a respective spoke at no load, driving it into saturation. Approximately, 60% of the flux generated by the rare earth magnet is shorted by the top bridge thereby saturating the top bridge.

Figure 5:
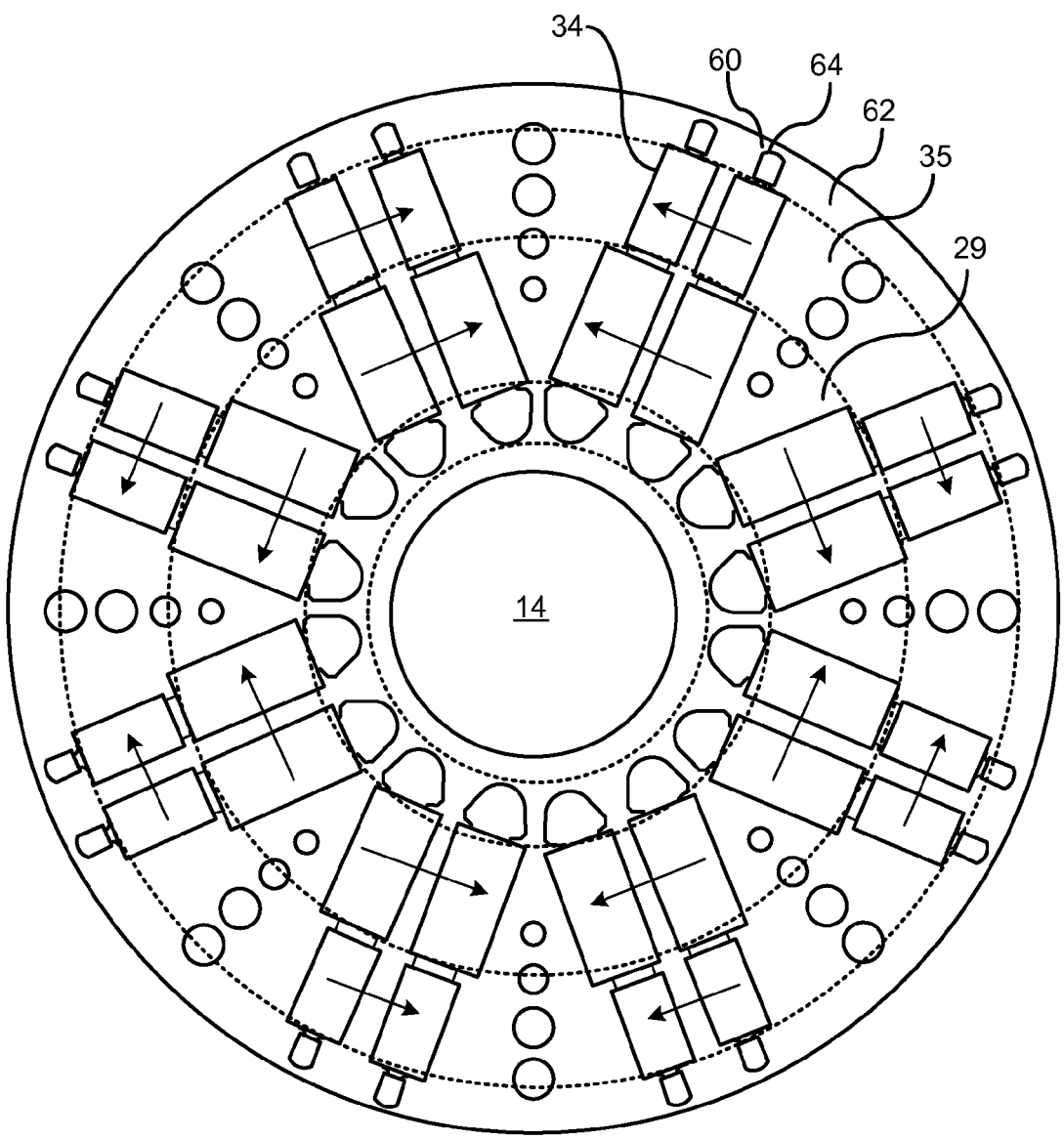
FIG. 5 is a section view of a rotor utilizing three-piece permanent magnets.

FIG. 5 illustrates a rotor of a split pole spoke machine utilizing three-piece permanent magnets. If the torque of the motor requires three-piece permanent magnets, then a fifth set of apertures 60 are formed radially outward from the fourth set of apertures 34 in an outermost radial layer 62. A third set of permanent magnets 64 is inserted in the fifth set of apertures 60 in the outermost radial layer 62. Each pole of the rotor will include a respective split pair of permanent magnets inserted in the middle radial layer 29, the outer radial layer 35, and the outermost radial layer 62 for each pole of the motor. Each respective pair of magnets, including those disposed in the outermost radial layer 62, is circumferentially spaced from one another. As illustrated in FIG. 4, the permanent magnets of each layer are of a different size. In the example shown, the permanent magnets in the middle radial layer 29 are larger in comparison to the permanent magnets in the outer and outermost radial layers 35 and 62, whereas the permanent magnets in the outermost radial layer 62 are smaller in comparison to the permanent magnets in the middle and outer radial layers 29 and 35. The permanent magnets of the outer radial layer 35 are sized between the permanent magnets of the middle radial layer 29 and the outer radial layer 62.

Preferably, the smaller permanent magnets in the third radial layer 62 should have a high residual induction and a high demagnetization field. Residual induction (Br), also known as residual flux density, is the remaining magnetic induction after saturation and after removal of the magnet field in a closed-circuit. The demagnetizing field (H) is applied to previously full saturated magnets to generate a demagnetization curve, whereas coercivity (Hc), also known as coercive force, is the demagnetizing field required to reduce the magnetic induction to zero. The smaller permanent magnet in the third radial layer 62 may be replaced with an air pocket which lowers the costs, but reduces the power density.

Preferably, the permanent magnets of the middle radial layer 29 should be low-cost and have a low residual induction in the low coercive force (e.g., ferrite magnets).

It should be understood that each of the permanent magnets in the respective layers may vary in size and magnetic strength depending on the required torque and other factors such as inertia and flux flow. Alternatively, the permanent magnets in two or more layers may be of the same size and magnetic strength.

It is also understood that the top bridge used in the three-piece permanent magnets will function in a similar manner as describe above shorting the magnet flux therethrough.

While certain embodiments of the present invention have been described in detail, those familiar with the art to which this invention relates will recognize various alternative designs and embodiments for practicing the invention as defined by the following claims.

What is claimed is:

1. A rotor for a permanent magnet synchronous machine comprising:
   a rotor core structure;
   a first set of permanent magnets forming respective poles within the rotor core structure, each pole including a pair of permanent magnets from the first set of permanent magnets;
   a first set of apertures formed in a first radial layer of the rotor core structure, the first set of permanent magnets inserted within the first set of apertures, each pole includes a pair of apertures from the first set of apertures, the respective apertures within a respective pole are spaced a first circumferential distance apart;
   a second set of apertures formed in a second radial layer of the rotor core structure, wherein each pole includes a pair of apertures from the second set of apertures, wherein the second set of apertures is formed radially inward from the first set of apertures;
   a third set of apertures formed in a third radial layer of the rotor core structure, wherein the third set of apertures is formed radially outward from the first set of apertures;
   a second set of permanent magnets inserted within the third set of apertures, the second set of permanent magnets having a different magnetic field strength relative to the first set of permanent magnets, wherein each pole includes a pair of permanent magnets from the first set of permanent magnets and a pair of permanent magnets from the second set of permanent magnets cooperatively generating a magnetic field in a same direction;
   wherein the permanent magnets in the first and second layers of a respective pole generates the magnetic field in a direction opposite to a magnetic field generated by the permanent magnets in the first and second layers of an adjacent pole.

2. The rotor of claim 1 wherein the second set of apertures are an extension of the first set of apertures, and wherein a shape of the second set of apertures is different from a shape of the first set of apertures.

3. The rotor of claim 1 wherein a respective aperture from the second set of apertures within the respective pole and the adjacent pole form a spoke-structure therebetween.

4. The rotor of claim 1 wherein each respective aperture in the third radial layer of the rotor core structure are radially aligned with a respective aperture in the first layer of the rotor core structure.

5. The rotor of claim 4 wherein the rotor core structure includes an outer circumferential edge, wherein the rotor core structure further includes a plurality of bridges disposed between the third set of apertures and the outer circumferential edge, and wherein the permanent magnets in the first radial layer saturate the plurality of bridges.

6. The rotor of claim 1 further comprising:
a fourth set of apertures in the rotor core structure, the fourth set of apertures disposed between each respective pole, the fourth set of apertures reducing the weight of the rotor.

7. The method of claim 6 further comprising:
a fifth set of apertures formed in a fourth radial layer of the rotor core structure, wherein the fifth set of apertures is formed radially outward from the third set of apertures.

8. The rotor of claim 7 wherein each respective aperture in the fourth radial layer of the rotor core structure are radially aligned with a respective aperture in the third layer of the rotor core structure.

9. The rotor of claim 7 wherein the rotor core structure includes an outer circumferential edge, wherein the rotor core structure further includes a plurality of bridges disposed between the firth set of apertures and the outer circumferential edge, and wherein the permanent magnets in the third radial layer saturate the plurality of bridges.

10. The rotor of claim 7 further comprising a third set of permanent magnets inserted within the fifth set of apertures, wherein each pole includes a pair of permanent magnets from the first, third, and fourth radial layers cooperatively generating a magnetic field.

11. The rotor of claim 10 wherein the pairs of permanent magnets in the first, third, and fourth layers of a respective pole generates the magnetic field in a direction opposite to a magnetic field generated by the permanent magnets in the first, third, and fourth layer of the adjacent pole.

12. The rotor of claim 11 wherein the rotor core structure includes an outer circumferential edge, wherein the rotor core structure further includes a plurality of bridges disposed between the fifth set of apertures and the outer circumferential edge, and wherein the permanent magnets in the fourth radial layer saturate the plurality of bridges.

13. The rotor of claim 12 wherein the rotor core structure includes an outer circumferential edge, wherein the rotor core structure further includes a plurality of bridges disposed between the fifth set of apertures and the outer circumferential edge, and wherein the poles are substantially unsaturated and the bridges and spokes are substantially saturated.

14. The rotor of claim 11 wherein the plurality of permanent magnets in the first radial layer have a residual flux density and coercive force higher than the plurality of permanent magnets in the third radial layer.

15. The rotor of claim 11 wherein the plurality of permanent magnets in the first radial layer have a residual flux density and coercive force higher than the plurality of permanent magnets in the fourth radial layer.

16. The rotor of claim 1 wherein the rotor core structure includes a plurality of single piece spoke-type stacked laminations.

* * * * *